United States Patent [19]

Scholz

[11] Patent Number: 4,697,852
[45] Date of Patent: Oct. 6, 1987

[54] SPRING-LOADED PARKING BRAKE AND SERVICE-BRAKE SYSTEM FOR TRAILERS

[75] Inventor: Helmut Scholz, Bischweier, Fed. Rep. of Germany

[73] Assignee: Daimler-Benz Aktiengesellschaft, Fed. Rep. of Germany

[21] Appl. No.: 831,555

[22] Filed: Feb. 21, 1986

[30] Foreign Application Priority Data

Feb. 23, 1985 [DE] Fed. Rep. of Germany ....... 3506418

[51] Int. Cl.$^4$ ................. B60T 13/38; B60T 13/68
[52] U.S. Cl. ................................. 303/7; 188/106 R; 188/170; 303/6.01; 303/20; 303/9; 303/15; 303/71
[58] Field of Search ......................... 303/2–4, 303/6 R, 6 A, 6 M, 7, 8, 9, 13–17, 20, 50–56, 71, DIG. 3, 47; 188/170, 3 R, 156–165, 171, 3 H, 112, 106

[56] References Cited

U.S. PATENT DOCUMENTS

| 2,985,489 | 5/1961 | Stelzer | 303/7 X |
| 3,497,267 | 2/1970 | Dobrikin | 303/7 |
| 3,507,542 | 4/1970 | Cannella | 303/7 |
| 3,907,071 | 9/1975 | Wells | 303/7 X |
| 3,973,805 | 8/1976 | Stevenson et al. | 303/71 X |
| 3,984,149 | 10/1976 | Reinecke et al. | 303/71 X |
| 4,057,297 | 11/1977 | Beck et al. | 303/71 |
| 4,400,039 | 8/1983 | Ogata | 303/71 X |
| 4,522,450 | 6/1985 | Heilhecker et al. | 303/9 |
| 4,568,129 | 2/1986 | Stumpe | 303/15 X |
| 4,585,278 | 4/1986 | Grauel et al. | 303/15 X |
| 4,593,954 | 6/1986 | Campanini | 303/7 |

FOREIGN PATENT DOCUMENTS 2720632 12/1977 Fed. Rep. of Germany .

Primary Examiner—Douglas C. Butler

[57] ABSTRACT

A spring-loaded parking-brake and service-brake system for trailers of motor-vehicle combinations is provided which increases safety. The system does this by allowing the service brake of the trailer to respond at the same time as the service brake of the towing motor vehicle, and the spring-loaded parking brake of the trailer to respond at the same time as the parking brake of the motor vehicle. To guarantee safe parking and maneuvering of the uncoupled trailer, the control system of the spring-loaded trailer parking brake is electrical, and furthermore the service brake is also controlled by an additional electrical signal. For this purpose two electrical coupling parts, a pneumatic control-line coupling and a pneumatic supply coupling are attached to the trailer.

17 Claims, 2 Drawing Figures

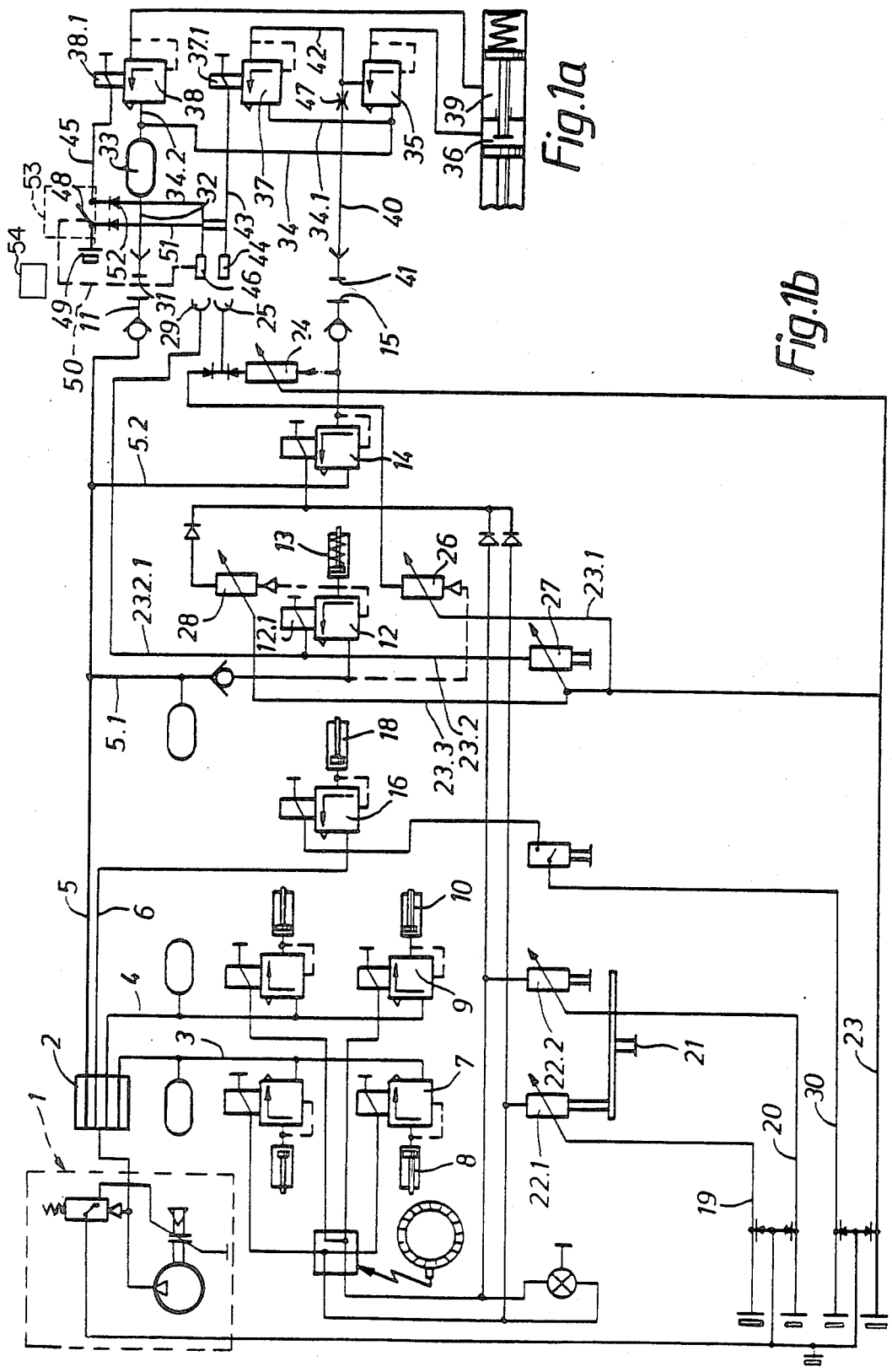

SPRING-LOADED PARKING BRAKE AND SERVICE-BRAKE SYSTEM FOR TRAILERS

BACKGROUND AND SUMMARY OF THE INVENTION

The invention relates to a spring-loaded parking-brake and service-brake system for trailers towed by motor vehicles.

An example of a spring-loaded parking-brake and service-brake system for trailers is shown in German patent Specification No. 2,720,632. In this system, a pneumatic signal corresponding to the actuation of the service brake in the motor vehicle is supplied to a control valve by a control-line coupling. The pressure medium controlled by the control valve and coming from the storage vessel then actuates the service brake of the trailer. Furthermore, the spring-loaded parking brake of the trailer is actuated by a trailer parking-brake valve which is controlled pneumatically by a manual parking-brake valve and a manual release valve connected to the parking-brake valve.

To apply the trailer parking brake, the parking-brake valve is brought into the parking position, with the result that the pressure medium from the storage vessel is applied to the lower relay piston of the trailer parking-brake valve. The lower relay piston is thereby pressed upwards and opens an outlet, through which the pressure medium flows out of the spring-loaded brake cylinders into the surrounding area.

If the braked trailer is to be maneuvered when uncoupled, the parking valve has to be brought into the driving position and the release valve pressed. As a result, pressure medium is supplied from the storage vessel to the spring-loaded parking brake by the trailer parking-brake valve and the spring-loaded parking brake is released. A further pneumatic connection between the supply line and the trailer parking-brake valve ensures, when the trailer breaks contact, that the spring-loaded parking brake is applied temporarily.

Because the service-brake and spring-loaded parking-brake systems are controlled in the above system by purely pneumatic means, the brakes can only react after a certain response time as a result of the time required for pressure to build up. Also, this system has a complicated and expensive design, since three different valves are provided in this brake system. These are the parking-brake valve, the release valve and the trailer parking-brake valve, each being of complicated design in itself and therefore expensive to produce. Furthermore, the trailer parking-brake valve is controlled by long lines with complicated routing, the disadvantages being that a very large amount of space is taken up, and also, line losses can occur.

A further disadvantage is evident in that when the trailer is maneuvered in the uncoupled state, the control lines are also bled in addition to the spring-loaded brake cylinders, with the result being that the air in the storage vessel is rapidly used up. Moreover, to make maneuvering possible, two valves first have to be actuated manually.

An adverse effect can also arise in the above-described system because the automatically actuated trailer parking brake is applied only temporarily when the trailer breaks contact or is uncoupled from the motor vehicle. In this state, the trailer parking brake can only be released as a result of pressure on the release valve, to put the trailer in an unbraked state. It is therefore only possible to park the uncoupled trailer safely if the driver sets the parking-brake valve to parking position.

After the trailer has been coupled again, the parking-brake valve has to be brought into the driving position again to release the spring-loaded trailer parking brake. In this state, however, the vehicle-trailer connection is retained only by the parking brake of the motor vehicle. Also, when the trailer is coupled, its spring-loaded parking brake cannot be actuated from the motor vehicle or at the same time as the parking brake of the motor vehicle. In particular, when the vehicle combination is parked or left standing, the driver must apply the parking brake in the motor vehicle, dismount and bring the lever on the parking-brake valve of the still unbraked trailer into the parking position. Only by doing this is the spring-loaded parking brake of the trailer applied. In general terms, therefore, safe parking of the trailer both when coupled and when uncoupled is possible only by actuating the parking-brake valve on the trailer and is therefore dependent on the conscientiousness of the driver.

An object of the present invention is to develop a spring-loaded parking-brake and service-brake for trailers, which provides for maximum possible safety despite a simple design, and which allows the uncoupled trailer to be maneuvered simply and safely.

These and other objects are attained according to the invention by providing a parking brake and service brake system for a trailer towed by a motor vehicle with a service brake and a parking brake in the trailer, a pressure medium supply device for supplying a pressure-medium, and a fluidic supply coupling means for fluidly coupling the motor vehicle and the trailer. A fluidic control-line coupling supplies a fluidic control signal from the vehicle to the trailer when the service brake of the vehicle is actuated. Also provided is a control valve for supplying a controlled amount of the pressure-medium to the trailer service brake in response to the fluidic control signal. This control valve is fluidly connected to the control-line coupling and the trailer service brake.

The system also provides a first electrical trailer coupling for transmitting electrical signals between the vehicle and the trailer, and a pilot valve for supplying a second fluidic control signal to the control valve in response to electrical signals from the first electrical coupling. This pilot valve is fluidly connected to the control valve and electrically connected to the first electrical coupling.

One advantage of the invention is that, in addition to the fluidic signal, an electrical signal is also used to control the service brake, thus making it possible for the service brake to respond rapidly and thereby increase safety.

An especially preferred embodiment of this system provides a second electrical trailer coupling for transmitting electrical signals between the vehicle and the trailer when either the parking brake of the motor vehicle is actuated or a randomly generated electrical signal is transmitted. A trailer parking brake valve supplies the pressure medium to the trailer parking brake in response to electrical signals from the second electrical coupling. The trailer parking brake valve is fluidly connected to the trailer parking brake and the storage vessel, and is electrically connected to the second electrical trailer coupling.

Substantial advantages are obtained by this preferred embodiment of the invention because of the electrical control of the trailer parking-brake valve. The use of an electrically controlled valve makes it possible to achieve a simple design of the spring-loaded trailer parking-brake system. Consequently, no valves differing from one another and that are complicated to produce are used, allowing for reduced production costs. Safety is increased because, when the trailer is coupled to the traction vehicle, its spring-loaded parking brake is actuated at the same time as the parking brake in the motor vehicle is actuated. The driver therefore does not have to additionally bring the spring-loaded parking brake of the trailer into the braking position, this normally being carried out by reversing a switch on the trailer.

Another advantage is that the spring-loaded parking brake automatically switches into the braking position when the trailer is uncoupled from the motor vehicle. Furthermore, the trailer remains fully maneuverable when uncoupled, since the spring-loaded trailer parking brake can be actuated by means of the randomly generated electrical signal which can be transmitted.

A further advantage is that, when the spring-loaded trailer parking brake is switched, only the air from the spring-loaded trailer parking-brake cylinders is used up. Moreover, after the trailer has been coupled again, the spring-loaded parking brake is automatically switched to "driving" or "braking" at the same time as the parking brake in the motor vehicle is actuated. In other words, the spring-loaded parking brake of the trailer remains in the braking position during the coupling of the trailer to the motor vehicle when the parking brake of the latter is set at "braking" and switches to "driving" when the parking brake of the motor vehicle is released.

A great advantage of preferred embodiments of this system is that the spring-loaded parking brake in the trailer is actuated completely automatically either at the same time as the parking brake in the motor vehicle is actuated or when the trailer is uncoupled, so that safe parking of the trailer is therefore carried out irrespective of the conscientiousness of the driver.

Additional features of a preferred embodiment of the present invention provide further advantages. For example, by providing that the pneumatic coupling parts and the electrical coupling parts form a single connection unit, the trailer can be fluidly and electrically connected to the motor vehicle all at once. This ensures that when the pneumatic connections are broken, the electrical connections are also broken at the same time, so that the trailer parking brake is actuated immediately.

Further objects, features, and advantages of the present invention will become more apparent from the following description when taken with the accompanying drawings, which show for purposes of illustration only, an embodiment constructed in accordance with the present invention.

BRIEF DESCRIPTION OF THE DRAWINGS

FIG. 1a shows a circuit diagram of a spring-loaded parking-brake and service-brake system for trailers constructed in accordance with a preferred embodiment of the present invention; and FIG. 1b shows a preferred embodiment of an associated braking system of a motor vehicle.

DETAILED DESCRIPTION OF THE DRAWINGS

The motor vehicle brake system illustrated in FIG. 1b contains a pressure-medium supply device 1 and a four-circuit safety valve 2, from which extend four pressure-medium supply lines 3,4,5 and 6. The first pressure-medium supply line 3 is connected by valves 7 to the brake cylinders 8 for the front-wheel brake. The second pressure-medium supply line 4 is connected by valves 9 to the brake cylinders 10 for the rear-wheel brake. The third pressure-medium supply line 5 connects the four-circuit safety valve 2 to the pneumatic supply coupling 11. Two lines branch off from this pressure-medium supply line 5, the first branch line 5.1 being connected by a further valve 12 to the cylinder 13 of the vehicle parking brake, and the second branch line 5.2 being connected to the pneumatic control-line coupling 15 by a trailer control valve 14. The fourth pressure-medium supply line 6 is connected to the secondary consumer 18 via a further valve 16.

The electrical control part of the brake system is described below. The first electrical connection 19 leads, through a first variable resistor 22.1 actuated by the foot-brake pedal 21, to the valves 7 for the front-wheel brake and also to the trailer control valve 14. The second electrical connection 20 leads, through a second variable resistor 22.2 also actuated by the foot-brake pedal 21, to the valves 9 for the rear wheel brake and also to the trailer control valve 14.

The third electrical connection 23 leads, through a variable resistor 24 that is actuated by the pressure medium, to a first electrical trailer coupling part 25. Further electrical lines branch off from this electrical connection 23, and of these the first branch line 23.1 leads to the first electrical trailer coupling part 25 through a further variable resistor 26 which is actuated by a pressure medium. The variable resistor 26 is actuated when there is a pressure drop in the supply line 5.1 and consequently serves as protection against a break in contact between the vehicle and the trailer. The second branch line 23.2 leads through the manually actuable variable resistor 27 to the valve 12 for the parking brake. The third branch line 23.3 leads to the trailer control valve 14 through a further variable resistor 28 which is actuated by a pressure medium. An electrical branch line 23.2.1 branching off from the second branch line 23.2 leads to the second electrical trailer coupling part 29. The fourth electrical connection 30 leads to the valve 16 for the secondary consumer 18.

A preferred embodiment of the trailer component of the spring-loaded parking-brake and service-brake system of the present invention is illustrated in FIG. 1a and contains a pneumatic supply coupling 31 connected to the storage vessel 33 by the supply line 32. A supply line 34 extending from the storage vessel 33 is connected to the brake cylinder 36 of the service brake by the control valve 35. A first supply branch line 34.1 branching off from this supply line 34 is connected to the pilot valved 37. The second supply branch line 34.2 is connected by the trailer parking-brake valve 38 to the cylinder 39 of the spring-loaded trailer parking brake. Furthermore, a first pneumatic control line 40 connects the pneumatic control-line coupling 41 to the control valve 35, and a second pneumatic control line 42 connects the pilot valve 37 to the control valve 35.

The electrical control part of this system contains the first electrical connection 43, which connects the first electrical trailer coupling part 44 to the pilot valve 37, and the second electrical connection 45 which connects the second electrical trailer coupling part 46 to the trailer parking-brake valve 38. A diode 52 is connected between the electrical trailer coupling part 46 and the trailer parking-brake valve 38. Also included is the electrical control part of this sytem is the trailer battery 49 and a switch 48. The trailer battery 49 is connected to the second electrical coupling part 46 with a diode 52 connected between them. A further feature of a preferred embodiment provides a lockable housing 53 enclosing the switch 48.

The operation of the preferred embodiment of the spring-loaded parking-brake and service-brake system is as follows:

The braking system of the trailer is operated from the motor vehicle when the trailer is connected to the vehicle. When the variable resistors 22.1 and 22.2 are actuated by the foot-brake pedal 21, an appropriate electrical current flows. This current flow ensures that the brake cylinders 8 of the front-wheel brake and the brake cylinders 10 of the rear-wheel brake are actuated. It also ensures that the pressure medium is regulated by the trailer control valve 14 and is supplied to the control valve 35 through the pneumatic control-line couplings 15, 41.

The pressure medium regulated by the trailer control valve 14 also loads the variable resistor 24 which generates an electrical signal proportional to the pressure medium. This electrical signal is supplied, via the first electrical coupling part 25, 44, to the electrical actuating device 37.1 of the pilot valve 37 which switches to transmission in accordance with the electrical signal. The pilot valve 37 regulates the pressure medium supplied via the control line 42 to the control valve 35 and switches the latter to transmission. The pressure medium flowing through the control valve 35 enters the cylinders 36 of the service brake and causes braking.

The pressure medium regulated by the trailer control valve 14 arrives at the control valve 35 with a delay because of the time required for pressure to build up in the pneumatic control line 40. To prevent the pressure built up in the pneumatic control line 40 from being influenced by the regulated pressure medium of the pneumatic control line 42, a throttle 47 is provided in the pneumatic control line 40. The additional electrical control ensures that the trailer is braked at the same time as the motor vehicle and thus increases safety.

For the parking brake, the electrical connection 23.2 is conducting in the driving state, so that when the valve 12 for the parking brake is switched to transmission, the working spring of the spring accumulator 13 is tensioned by means of compressed air and the wheel brake is released. Furthermore, the electrical branch line 23.2.1 is also conducting, so that current is applied to the electrical actuating device 38.1 of the trailer parking-brake valve 38 through the second electrical connection 45. Thus, the trailer parking-brake valve 38 is also switched to transmission and the working spring of the spring accumulator 39 is tensioned by means of compressed air, with the result that the wheel brake is released.

The spring-loaded trailer parking brake of the trailer and of the motor vehicle is actuated by a mechanical hand-actuable variable resistor 27 which controls both the valve 12 of the parking brake and, through the second electrical coupling 29, 46, the trailer parking-brake valve 38. In the braking state, the actuating device 12.1 of the valve 12 for the parking brake and the actuating device 38.1 of the trailer brake valve 38 are dead, with the result that these valves 12 and 38 are switched to bleeding. In this state, the wheel brakes are applied by the working springs of the spring accumulator. Consequently, the spring-loaded parking brake of the trailer is actuated at the same time as the parking brake of the traction vehicle.

On conventional trailers, a control signal corresponding to the actuation of the parking brake in the traction vehicle ca be supplied additionally to the service brake of the trailer by the first electrical coupling part 25, 44 and by the pneumatic control-line coupling 15, 41. As a result, the service brake in the traction vehicle is actuated during parking.

The service brake of the trailer also reacts to an electrical signal from the contact-breaking protection device, which is generated by the variable resistor 26 in the traction vehicle, the electrical signal being supplied to the actuating device 37.1 of the pilot valve 37 which actuates the service brake of the trailer by the control valve 35. If the trailer parking-brake valve 38 is designed as a pressure-regulating valve with an analog control, the spring-loaded parking brake of the trailer can be used as an auxiliary brake which actuates the spring-loaded parking brake of the trailer according to the actuation of the parking brake in the motor vehicle, thereby providing a sensitive braking of the trailer.

In the preferred embodiment of the present invention, all the electrically controlled valves are standard pressure-regulating valves which are used both in the trailer braking system and in the braking system of the motor vehicle. Furthermore, the cylinders of the service brake and the cylinders of the spring-loaded parking brake in the trailer are preferably designed as multi-purpose cylinders.

To uncouple the trailer, the pneumatic and electrical coupling parts 41, 44, 46, and 31 are released from the corresponding coupling parts 15, 25, 29 and 11 of the motor vehicle. The second electrical coupling part 46 and consequently the actuating device 38.1 of the trailer parking-brake valve therefore become dead, with the result that the cylinder 39 of the spring-loaded brake is bled and the wheel brake is applied.

If the uncoupled trailer is to be maneuvered, current can be supplied from the trailer battery 49 by actuating the switch 48 of the actuating device 38.1 of the trailer parking-brake valve 38. Because current is supplied, the trailer parking-brake valve 38 is switched to transmission and supplies pressure medium from the storage vessel 33 to the cylinder 39 of the spring-loaded parking brake, with the result that the wheel brake is released. Voluntary or involuntary release of the switch 48 means that the actuating device 38.1 of the trailer parking-brake valve 38 becomes dead and the wheel brake is consequently applied by means of the working spring of the spring accumulator. The spring-loaded parking brake can also be controlled from an external current source through a coupling shoe attached on the second electrical coupling part 46. This is advantageous when the trailer battery is discharged or is not yet installed.

The switch 48 is housed in a lockable housing 53 which provides protection against unwarranted activation of the switch 48. In preferred embodiments, the switch 48 is attached to the trailer near a drawbar 54.

When the trailer is coupled again, after the second electrical coupling part 46 has been connected, the spring-loaded parking brake of the trailer automatically assumes the position corresponding to the actuation of the parking brake in the motor vehicle. The spring-loaded parking brake of the trailer is now actuated again by the actuation of the parking brake in the motor vehicle.

The mechanically operative connection 50 opens the switch 48 when the trailer is coupled, thus guaranteeing that only electrical signals corresponding to the actuation of the parking brake in the motor vehicle are supplied to the actuating device 38.1 of the trailer parking-brake valve. Furthermore, when the trailer breaks contact the supply of current is cut off, and consequently the spring-loaded parking brake is actuated and the trailer is braked. The wheel brake applied in this way can then released again in the way described with reference to the uncoupled trailer.

Although the present invention has been described and illustrated in detail, it is to be clearly understood that the same is by way of illustration and example only, and is not to be taken by way of limitation. The spirit and scope of the present invention are to be limited only by the terms of the appended claims.

I claim:

1. A parking brake and service brake system for a motor vehicle and a trailer towed by said motor vehicle, comprising:

a service brake in said motor vehicle;

a service brake and a spring-loaded parking brake in said trailer;

said service brakes being actuable in response to an electrical service brake signal, and said parking brake being actuable in response to an electrical parking brake signal;

pressure-medium supply means for supplying a pressure-medium;

fluidic supply coupling means for providing a first fluid coupling of said motor vehicle and said trailer;

fluidic control-line coupling means for providing a second fluid coupling through wnich a first fluidic control signal from said vehicle to said trailer is supplied;

trailer control valve means for supplying a controlled amount of said pressure medium to said trailer service brake in response to said first fluidic control signal, said trailer control valve means being fluidly connected to said control-line coupling means and said trailer service brake;

first electrical trailer coupling means or transmitting said service brake signals between said vehicle and said trailer;

pilot valve means for supplying a second fluidic control signal to said trailer control valve means in response to said service brake signals from said first electrical coupling means, said pilot valve means being fluidly connected to said trailer control valve means and electrically connected to said first electrical coupling means;

a parking brake in said motor vehicle; second electrical trailer coupling means for transmitting said parking brake signals between said vehicle and said trailer;

trailer parking brake valve means for supplying said pressure medium to said trailer parking brake in response to said parking brake signals from said second electrical coupling means, said trailer parking brake valve means being fluidly connected to said trailer parking brake, and electrically connected to said second electrical trailer coupling means;

storage vessel means attached to said trailer and fluidly connected to said fluidic supply coupling means and said trailer parking brake valve means for supplying said pressure medium to said trailer parking brake and said trailer service brake;

means for generating said electrical signals transmitted by said second electrical trailer coupling means when at least one of said parking brake of said motor vehicle is actuated and a radom electrical signal is generated; and means for generating said fluidic control signal when said service brake of said vehicle is actuated;

wherein said pressure-medium is air.

2. The system of claim 1, wherein said pilot valve means and said trailer parking-brake valve means are pressure-regulating valves.

3. The system of claim 2, wherein said pilot valve means is a pressure-regulating valve with an analog control.

4. The system of claim 1, wherein said fluidic supply coupling means, fluidic control-line coupling means and said first and second electrical trailer coupling means form a single connection means for fluidly and electrically connecting said motor vehicle and said trailer.

5. The system of claim 1, further comprising a trailer battery electrically connected to said trailer parking brake valve means by a switch means.

6. The system of claim 5, wherein said trailer battery is connected to said second electrical coupling means.

7. The system of claim 6, futher comprising a diode means connected between said trailer battery and said second electrical coupling means.

8. The system of claim 5, wherein said switch means is a self-resetting pressure switch.

9. The system of claim 5, further comprising a mechanically operative connection between said switch means and said second electrical trailer coupling means for operating said switch means when said trailer is coupled to said vehicle.

10. The system of claim 5, wherein said switch means is attached to said trailer near a drawbar.

11. The system of claim 5, wherein said switch means is housed in a lockable housing.

12. The system of claim 1, further comprising a diode means connection between said second electrical coupling means and said trailer-parking brake valve means.

13. The system of claim 1, further comprising a trailer control valve means and an electrical regulating means on said vehicle for generating electrical signals when there is a pressure drop in said pressure-medium which are transmitted by said first electrical trailer coupling means to said trailer control valve means which causes actuation of said trailer service brake.

14. The system of claim 1, further comprising means for causing said second fluidic control signal to be supplied to said trailer control valve means through said fluidic control-line coupling when the parking brake in said motor vehicle is actuated.

15. The system of claim 1, further comprising an auxiliary brake means in said trailer which is actuated when the parking brake of said motor vehicle is actuated.

16. The system of claim 1, further comprising a throttle in a fluidic control line between said control line coupling means and said control valve means.

17. The system of claim 1, wherein said second electrical coupling means includes means for connecting to an external current source separate from said vehicle.

* * * * *